(12) United States Patent
Mancl et al.

(10) Patent No.: US 7,265,468 B1
(45) Date of Patent: Sep. 4, 2007

(54) WATER REPELLENT MOTOR SLEEVE

(76) Inventors: Dennis J. Mancl, 284 Essex Dr., Bluff City, TN (US) 37618; Leonard J. Lavasser, 387 Carlton Rd., Bristol, TN (US) 37620

( * ) Notice: Subject to any disclaimer, the term of this patent is extended or adjusted under 35 U.S.C. 154(b) by 161 days.

(21) Appl. No.: 11/285,667

(22) Filed: Nov. 22, 2005

(51) Int. Cl.
*H02K 5/16* (2006.01)

(52) U.S. Cl. ............... 310/90; 310/54; 310/89; 417/423; 415/180

(58) Field of Classification Search ......... 310/52, 310/54, 58, 87–90; 417/423, 368; 415/180
See application file for complete search history.

(56) References Cited

U.S. PATENT DOCUMENTS

| | | | | |
|---|---|---|---|---|
| 2,829,286 | A * | 4/1958 | Britz | 310/53 |
| 3,060,335 | A * | 10/1962 | Greenwald | 310/54 |
| 3,371,613 | A * | 3/1968 | Dahlgren et al. | 417/368 |
| 3,443,519 | A * | 5/1969 | White | 417/366 |
| 3,525,001 | A * | 8/1970 | Erickson | 310/54 |
| 3,653,785 | A * | 4/1972 | Dahlgren et al. | 417/367 |
| 3,932,070 | A | 1/1976 | Porter et al. | |
| 4,347,442 | A | 8/1982 | White et al. | |
| 4,838,763 | A * | 6/1989 | Kramer et al. | 417/63 |
| 4,890,988 | A * | 1/1990 | Kramer et al. | 417/372 |
| 5,616,973 | A * | 4/1997 | Khazanov et al. | 310/54 |
| 5,661,356 | A | 8/1997 | Fisher et al. | |
| 5,704,717 | A | 1/1998 | Cochimin | |
| 6,247,702 | B1 | 6/2001 | Long et al. | |
| 6,379,127 | B1 | 4/2002 | Andrews et al. | |

* cited by examiner

*Primary Examiner*—Thanh Lam
(74) *Attorney, Agent, or Firm*—Robert J. Harter

(57) ABSTRACT

A high-speed universal motor running at over 10,000 or even over 20,000 rpm includes a non-rubbing water repellent sleeve that protects the bearings from moisture damage. Rather than having a sliding contact seal that can quickly wear out under such high speeds, the sleeve is made of material having a low solid surface energy so that the seal material itself repels waters on its own. TEFLON is the preferred material, which is relatively soft, so to prevent the compressibility of the seal from affecting the axial positioning of parts on the motor shaft, the seal is installed such that the seal does not contribute to the critically precise positioning of the shaft and the parts mounted to it. In some embodiments, for example, the relatively soft seal simply overlies a much stiffer, accurately machined metal spacer.

20 Claims, 3 Drawing Sheets

WATER REPELLENT MOTOR SLEEVE

BACKGROUND OF THE INVENTION

1. Field of the Invention

The subject invention generally pertains to electric motors and more specifically to a device for protecting a motor's bearings from moisture contamination.

2. Description of Related Art

The motors of some vacuum cleaners, particularly water extractor appliances such as carpet cleaners and wet/dry vacuums, are exposed to a significant amount of moisture-laden air. To protect the motor's bearing from being damaged by the moisture, a seal can be installed between the bearing's inner and outer races or somewhere between the motor's rotating shaft and the motor's stationary housing. As the motor turns, such seals rub against a sealing surface, which can eventually wear out the seal or wear out the surface against which the seal rubs.

Nonetheless, such rubbing style seals can have an acceptably long life when applied to induction motors that run at 1800 rpm or some other relatively low speed tied to the line frequency of the motor's supply current.

Lightweight vacuum cleaners and other portable appliances, on the other hand, preferably have a more lightweight motor, such as a universal or series motor. The rotational speed of universal motors are not limited by the frequency of the motor's electric supply, so they may run at over 20,000 rpm. Thus, rubbing style seals for universal motors may need exceptionally high wear resistance (both the seal itself and the surface against which it rubs). Moreover, universal motors need to me manufactured to very close tolerances to run at such high speeds.

Consequently, seals for universal motors preferably have high wear resistance, sufficient flexibility to provide a shape conforming seal, sufficient rigidity to meet the motor's tolerance requirements, and low coefficient of friction to avoid generating heat. It can be difficult, however, to provide a single seal having all of those qualities.

SUMMARY OF THE INVENTION

An object of some embodiments of the invention is to protect the bearings of a high speed universal or series motor from moisture contamination without subjecting the seal or its associated sealing surface to frictional wear.

Another object of some embodiments is to provide a motor with a water repellent sleeve whose length does not determine the axial positioning of various shaft-mounted parts, whereby the sleeve can be relatively soft and its length does not have to be made to close tolerances.

Another object of some embodiments is to provide a motor with a water repellent sleeve whose outer diameter does not need to rub up against a sealing surface, whereby the sleeve's outer surface can be relatively soft.

Another object of some embodiments is to repel moisture within a motor by using a sleeve made of a material having a solid surface energy that is lower than other parts of the motor.

Another object of some embodiments is to use a water repellent sleeve made of a material that has excellent water repelling properties but has relatively poor wear resistance. TEFLON is an example of such a material.

Another object of some embodiments is to press-fit a relatively soft water repellent sleeve over a much harder metal sleeve, wherein the metal sleeve can be used to accurately position certain parts on a motor's shaft.

Another object of some embodiments is to maintain fluid communication between a bearing and an impeller, thereby maintaining a gap around the outer perimeter of a water repellent sleeve, which avoids sleeve wear.

Another object of some embodiments is to completely surround the exterior surface of a water repellent sleeve to help protect the surface from wear.

Another object of some embodiments is to provide a motor with a water repellent slinger that effectively repels water even when the motor shaft is not turning.

One or more of these and/or other objects of the invention are provided by a motor that includes a water repellent sleeve having a relatively low solid surface energy.

DESCRIPTION OF THE PREFERRED EMBODIMENT

Figure 1:
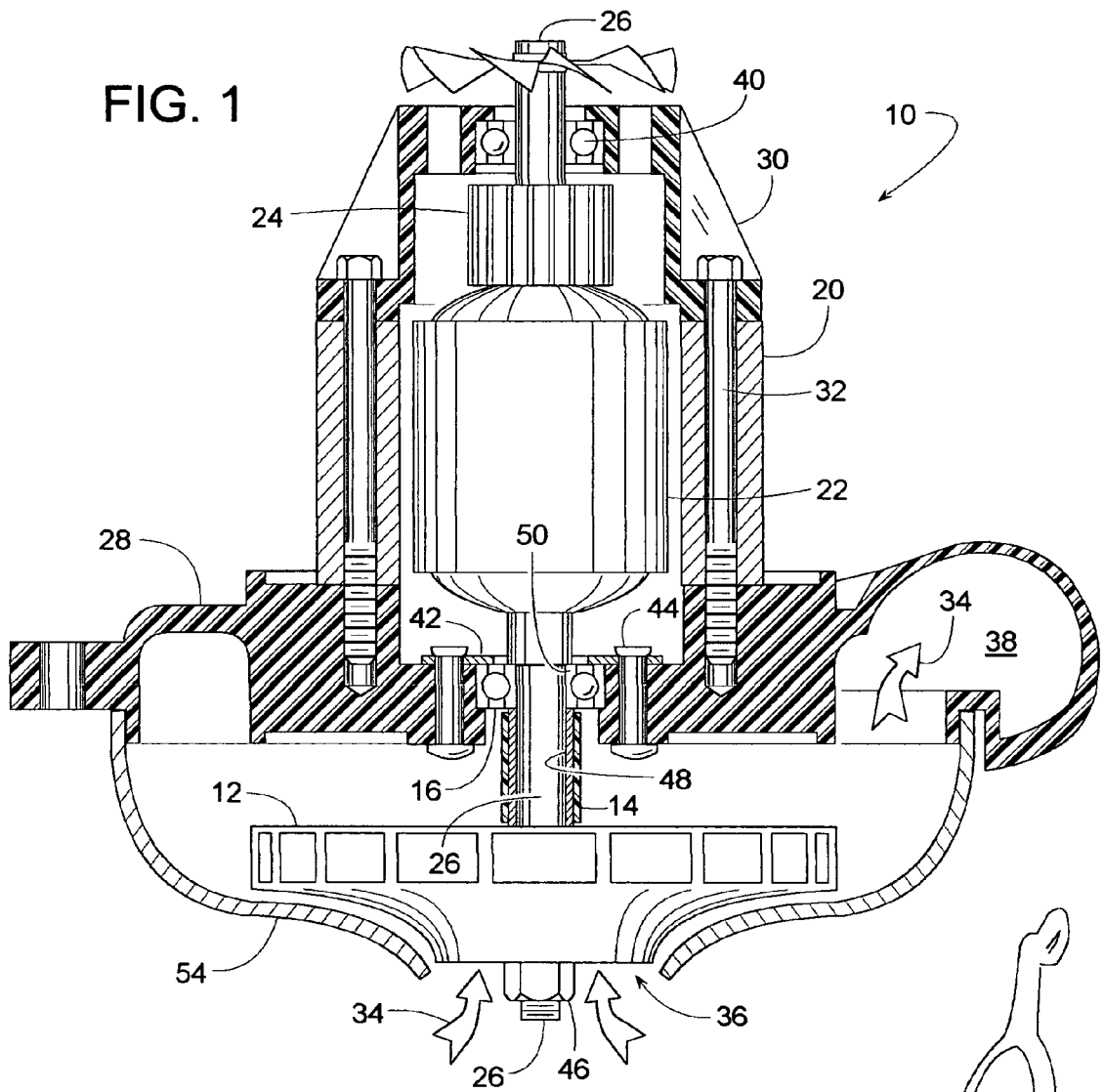
FIG. 1 is a cross-sectional view of a motor that includes a water repellent motor sleeve.
Figure 2:
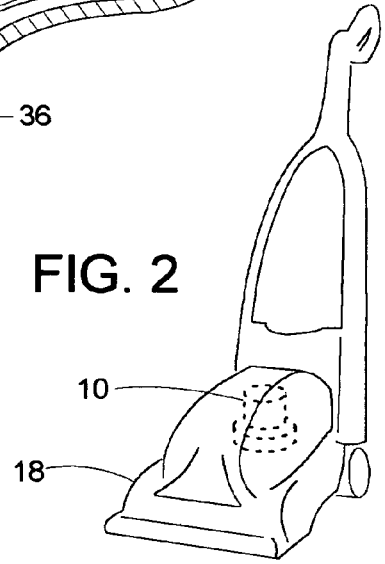
FIG. 2 is a perspective view of a water extractor appliance that includes the motor of FIG. 1.
Figure 3:
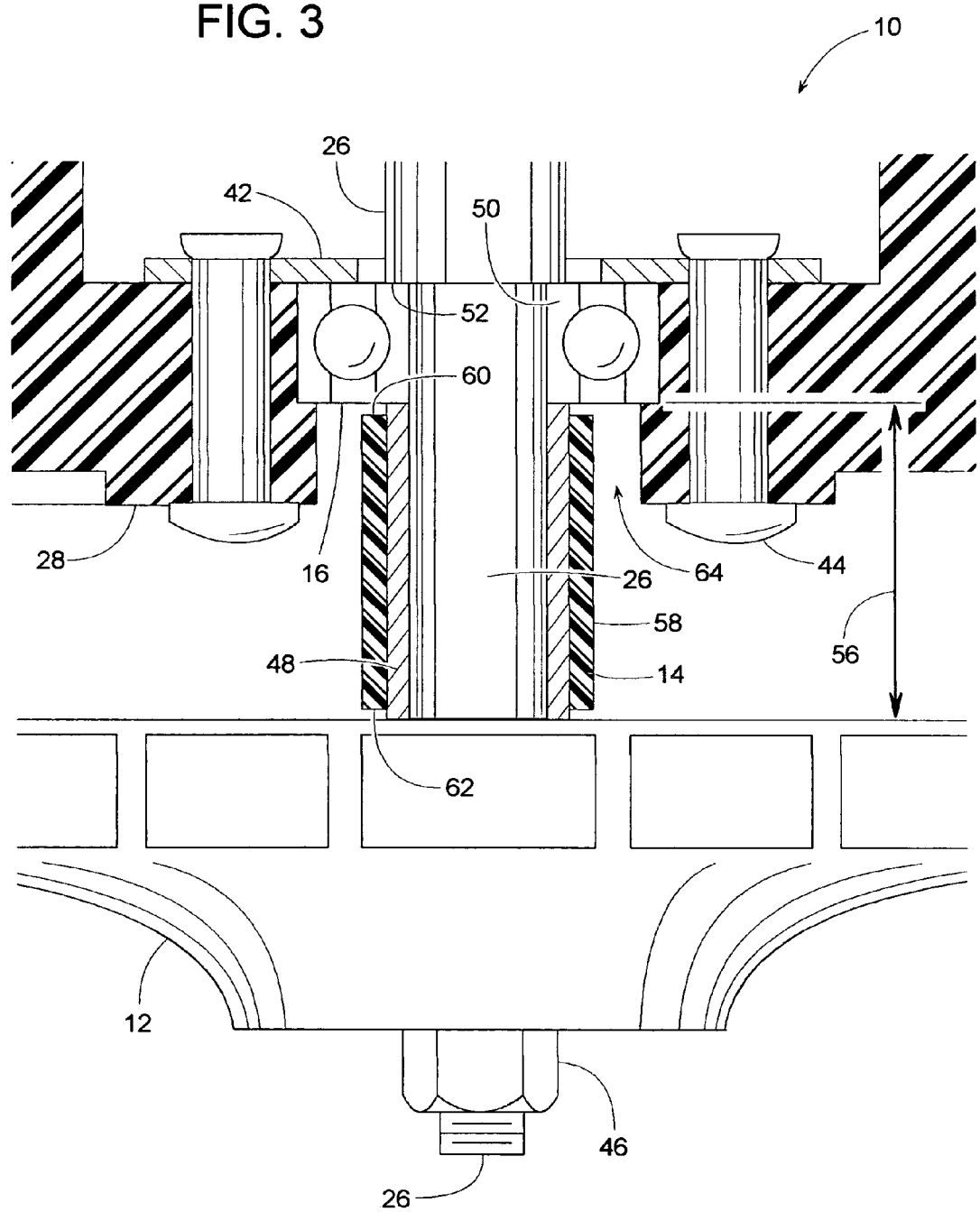
FIG. 3 is an enlarged view of a portion of the motor shown in FIG. 1.

Referring to FIGS. 1-3, a motor 10 driving an impeller 12 includes a water repellent sleeve 14 that helps protect an inboard bearing 16 from moisture contamination. Motor 10 is a universal motor powered by electrical current that flows in series through its rotor and stator such that motor 10 runs at speeds exceeding 10,000 rpm. Protection against moisture is particularly important when motor 10 and impeller 12 are used in a water extractor appliance 18 (FIG. 2), such as a carpet cleaner or a wet/dry vacuum cleaner. The moisture can be in the form of condensation on various surfaces of motor 10 or in the form of spray from water-laden air moved by impeller 12. Without sleeve 14, moisture tends to migrate or be driven from the general area of impeller 12 toward bearing 16. Before explaining the details of sleeve 14, the overall construction of motor 10 will first be described.

Motor 10 comprises a stator 20, a rotor 22 that includes a commutator 24 and a rotor shaft 26, a motor housing 28 made of plastic or some other material, and a commutator bracket 30 also made of plastic or some other material. Housing 28 and bracket 30 can be two individual parts or they can be incorporated into a single unitary piece. Two tie rods 32 are each threaded at one end so that they can screw into housing 28 for clamping stator 20 between housing 28 and bracket 30. Commutator 24 on rotor 22 is engaged by a pair of commutator brushes (not shown) to deliver electrical current to the rotor. The commutator brushes can be of any type including, but not limited to, those that are well known to those of ordinary skill in the art. The brushes, for example, can be carbon bars that are spring biased radially against commutator 24. When motor 10 powers extractor 18 or another type of vacuum cleaner, rotor 22 drives impeller 12, which forces a fluid 34 from a fan inlet 36 to a discharge outlet 38 of housing 28. Fluid 34 may be dry air, moisture-laden air, and/or water.

Inboard bearing 16 in housing 28 and an outboard bearing 40 in bracket 30 support rotor 22 within stator 20. To hold inboard bearing 16 in place, an annular bearing retainer 42 made of sheet metal is attached to housing 28 by way of a bearing retainer fastener 44. Bearing retainer fastener 44 represents any fastener for holding bearing retainer 42 to housing 28. Examples of fastener 44 include, but are not limited to, a rivet, a screw and nut assembly, a self-tapping screw, etc.

A threaded nut 46 screwed onto the inboard end of rotor shaft 26 axially clamps a tubular spacer 48, an inner race 50 of bearing 16, and impeller 12 between nut 46 and a shoulder 52 on shaft 26. This accurately positions impeller 12 within a surrounding shroud 54 and establishes a precise predetermined axial spacing 56 between impeller 12 and inner race 50 of bearing 16. Tubular spacer 48 is relatively rigid and preferably made of metal to withstand the clamping pressure of nut 46.

Since the metal of spacer 48 is not the best material to repel moisture, water repellent sleeve 14 is installed over spacer 48 so that sleeve 14 completely encircles spacer 48. In some embodiments, sleeve 14 is softer than spacer 48 and can be readily press fit over spacer 48 to create a radial interference fit between the two. Water repellent sleeve 14 is preferably made of a polymer having a lower solid surface energy than spacer 48, so moisture has less tendency to spread out along sleeve 14 than if sleeve 14 were made of metal or some other material with a higher solid surface energy.

In a currently preferred embodiment, sleeve 14 is made of polytetrafluoroethylene (e.g., TEFLON), which has a solid surface energy of about 18 to 20 dynes/cm. In comparison, common metals, such as aluminum, copper and iron, have a solid surface energy of about 44 to 46 dynes/cm. In alternate embodiments, sleeve 14 can be made of polyhexafluoropropylene (about 16 dynes/cm), fluorinated ethylene propylene (about 18 to 22 dynes/cm), or polytrifluoroethylene (about 22 dynes/cm). Still other choices of materials having a solid surface energy that is less than 40 dynes/cm include polypropylene (29 to 31 dynes/cm), polyethylene (30 to 31 dynes/cm), and polystyrene (33 to 35 dynes/cm). It appears that it is the generally soft materials that have the relatively low solid surface energy.

To prevent the compressibility or creep of the sleeve's relatively soft material from altering the axial position of the various parts mounted to rotor shaft 26 or altering the axial position of shaft 26 and commutator 24 relative to the commutator brushes or other generally stationary parts of motor 10, metal spacer 48, rather than sleeve 14, is what establishes the axial spacing between impeller 12 and bearing 16. To ensure that this is truly the case, in some embodiments, spacer 48 may actually be slightly longer than sleeve 14, as shown in FIG. 3.

In a currently preferred embodiment, sleeve 14, which rotates with rotor shaft 26, is spaced apart from all stationary parts of motor 10 for two reasons. One, TEFLON and certain other polymers have rather poor wear resistance, so rubbing friction between sleeve 14 and another motor part might quickly wear out sleeve 14 or the part against which sleeve 14 rubs. Two, friction between rotating sleeve 14 and an adjacent stationary part of motor 10 could decrease the motor's efficiency and generate unnecessary heat. To avoid these problems, sleeve 14 has an outer periphery 58 extending between two opposite faces 60-62, wherein outer periphery 58 is completely exposed to fluid 34, rather than rubbing against a solid material. Moreover, sleeve 14 helps define a radial gap 64 around itself, wherein gap 4 places inboard bearing 16 in fluid communication with impeller 12.

Figure 4:
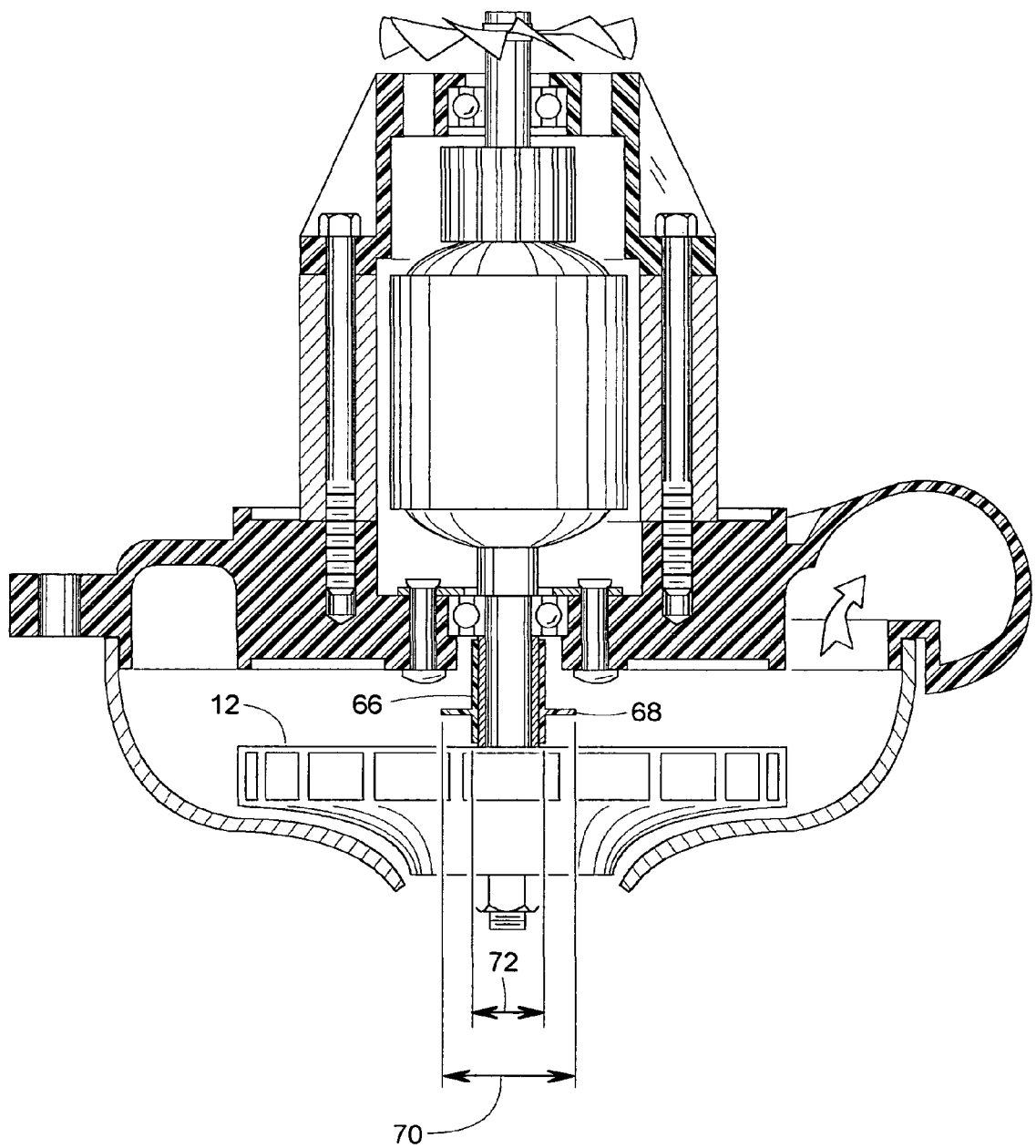
FIG. 4 is a cross-sectional view of a motor that includes another embodiment of a water repellent motor sleeve.

In some embodiments, as shown in FIG. 4, sleeve 14 is replaced by a similar water repellent sleeve 66. Sleeve 66, however, includes a slinger 68 having an outside diameter 70 that is greater than any other outside diameter 72 of sleeve 66. Slinger 68 helps deflect and radially throw moisture that encounters slinger 68.

Although the invention is described with reference to a preferred embodiment, it should be appreciated by those of ordinary skill in the art that various modifications are well within the scope of the invention. Therefore, the scope of the invention is to be determined by reference to the following claims.

The invention claimed is:

1. A motor, comprising:
 a housing;
 a bracket;
 an outboard bearing supported by the bracket;
 an inboard bearing comprising an inner race and an outer race, wherein the outer race is radially supported within the housing;
 a rotor with a rotor shaft having an outboard end and an inboard end, wherein the inboard end is supported by the inboard bearing, and the outboard end is supported by the inner race of the outboard bearing;
 a stator encircling the rotor and being interposed between the housing and the bracket;
 a tubular spacer attached to the inboard end of the rotor shaft;
 an impeller attached to the inboard end of the rotor shaft such that the tubular spacer is interposed between the impeller and the inboard bearing;
 a threaded nut attached to the inboard end of the rotor shaft such that the impeller and the tubular spacer are axially clamped between the threaded nut and the inner race of the inboard bearing to provide a predetermined axial spacing between the impeller and the inner race of the inboard bearing; and
 a water repellent sleeve encircling the tubular spacer, extending axially between the impeller and the inboard bearing, and being situated so as not to contribute to the predetermined axial spacing between the impeller and the inner race of the inboard bearing, wherein the water repellent sleeve has a lower solid surface energy than that of the tubular spacer.

2. The motor of claim 1, wherein the water repellent sleeve is softer than the tubular spacer.

3. The motor of claim 1, wherein the tubular spacer is comprised of a metal and the water repellent sleeve is comprised of a polymer.

4. The motor of claim 1, wherein the water repellent sleeve is comprised of polytetrafluoroethylene.

5. The motor of claim 1, wherein the water repellent sleeve is comprised of polyhexafluoropropylene.

6. The motor of claim 1, wherein the water repellent sleeve is comprised of fluorinated ethylene propylene.

7. The motor of claim 1, wherein the water repellent sleeve is comprised of polytrifluoroethylene.

8. The motor of claim 1, wherein the tubular spacer and the water repellent sleeve define a radial interference fit therebetween.

9. The motor of claim 1, wherein the tubular spacer is axially longer than the water repellent sleeve.

10. The motor of claim 1, wherein the water repellent sleeve helps define a radial gap therearound, wherein the radial gap places the inboard bearing in fluid communication with the impeller.

11. The motor of claim 1, wherein the water repellent sleeve includes a slinger having an outside diameter that is greater than any other outside diameter of the water repellent sleeve.

12. The motor of claim 1, wherein the water repellent sleeve includes two opposite faces and an outer periphery extending therebetween, wherein the outer periphery is completely exposed to a fluid.

13. The motor of claim 1, wherein the solid surface energy of the water repellent sleeve is less than 40 dynes/cm.

14. A motor, comprising:
a housing;
a bracket;
an outboard bearing supported by the bracket;
an inboard bearing comprising an inner race and an outer race, wherein the outer race is radially supported within the housing;
a rotor with a rotor shaft having an outboard end and an inboard end, wherein the inboard end is supported by the inboard bearing, and the outboard end is supported by the inner race of the outboard bearing;
a stator encircling the rotor and being interposed between the housing and the bracket;
a tubular spacer attached to the inboard end of the rotor shaft;
an impeller attached to the inboard end of the rotor shaft such that the tubular spacer is interposed between the impeller and the inboard bearing;
a threaded nut attached to the inboard end of the rotor shaft such that the impeller and the tubular spacer are axially clamped between the threaded nut and the inner race of the inboard bearing to provide a predetermined axial spacing between the impeller and the inner race of the inboard bearing; and
a water repellent sleeve that:
a) encircles the tubular spacer;
b) extends axially between the impeller and the inboard bearing;
c) is situated so as not to contribute to the predetermined axial spacing between the impeller and the inner race of the inboard bearing;
d) has a lower solid surface energy than that of the tubular spacer;
e) includes two opposite faces and an outer periphery extending therebetween, wherein the outer periphery is completely exposed to a fluid; and
f) is comprised of a polymer while the tubular spacer is comprised of a metal.

15. The motor of claim 14, wherein the water repellent sleeve is comprised of polytetrafluoroethylene.

16. The motor of claim 14, wherein the water repellent sleeve includes a slinger having an outside diameter that is greater than any other outside diameter of the water repellent sleeve.

17. The motor of claim 14, wherein the tubular spacer and the water repellent sleeve define a radial interference fit therebetween.

18. A motor, comprising:
a housing;
a bracket;
an outboard bearing supported by the bracket;
an inboard bearing comprising an inner race and an outer race, wherein the outer race is radially supported within the housing;
a rotor with a rotor shaft having an outboard end and an inboard end, wherein the inboard end is supported by the inboard bearing, and the outboard end is supported by the inner race of the outboard bearing;
a stator encircling the rotor and being interposed between the housing and the bracket;
a tubular spacer attached to the inboard end of the rotor shaft;
an impeller attached to the inboard end of the rotor shaft such that the tubular spacer is interposed between the impeller and the inboard bearing;
a threaded nut attached to the inboard end of the rotor shaft such that the impeller and the tubular spacer are axially clamped between the threaded nut and the inner race of the inboard bearing to provide a predetermined axial spacing between the impeller and the inner race of the inboard bearing; and
a water repellent sleeve that:
a) encircles the tubular spacer;
b) extends axially between the impeller and the inboard bearing;
c) is situated so as not to contribute to the predetermined axial spacing between the impeller and the inner race of the inboard bearing;
d) has a lower solid surface energy than that of the tubular spacer;
e) includes two opposite faces and an outer periphery extending therebetween, wherein the outer periphery is completely exposed to a fluid;
f) is comprised of a polymer while the tubular spacer is comprised of a metal;
g) helps define a radial gap therearound, wherein the radial gap places the inboard bearing in fluid communication with the impeller; and
h) help creates a radial interference fit between the tubular spacer and the water repellent sleeve.

19. The motor of claim 18, wherein the water repellent sleeve is comprised of polytetrafluoroethylene.

20. The motor of claim 18, wherein the water repellent sleeve includes a slinger having an outside diameter that is greater than any other outside diameter of the water repellent sleeve.

* * * * *